United States Patent Office 2,984,680
Patented May 16, 1961

2,984,680

METHOD FOR PREPARING DIPHENYL PHOSPHITES

Edward N. Walsh, Chicago Heights, Ill., assignor to Victor Chemical Works, a corporation of Illinois No Drawing. Filed Apr. 30, 1956, Ser. No. 581,357

8 Claims. (Cl. 260—461)

This invention relates to a method for making diaryl phosphites and the products produced thereby.

More specifically, this invention relates to a novel, simple method whereby diaryl phosphites may be made by reacting a triaryl phosphite with phosphorous acid.

Diaryl phosphites have been known since diphenyl phosphite was reported by Milobendzki and Szulgin, Chemik Polski 15, 66 (1917), but until the present invention no simple straightforward method for their production has been described. This is in sharp contrast to the production of alkyl phosphites which are prepared by simply reacting phosphorus trichloride with the appropriate alcohol.

According to the method of this invention, two moles of a triaryl phosphite are reacted with one mole of phosphorous acid to form three moles of diaryl phosphite according to the following equation wherein R is an aryl radical:

$$2(RO)_3P + H_3PO_3 \longrightarrow 3(RO)_2\overset{O}{\underset{}{P}}H$$

As can be seen from the above equation, since no by-products are formed, the purity of the final diaryl phosphite is dependent upon the completeness of the reaction and the stoichiometric accuracy of the amounts of reactants. Therefore, exact stoichiometric proportions are preferred. The proportions are not critical, however, as the reaction will proceed in the presence of large excesses of either reactant, but the product produced will be contaminated with the excess reactant, thus creating a physical separation problem.

The following examples illustrate the process of this invention:

Example 1

Preparation of diphenyl phosphite. 124 g. of triphenyl phosphite and 16.4 g. of phosphorous acid were placed in a reaction flask which had been equipped with a stirrer, thermometer and heating mantle. The phosphorous acid formed an insoluble layer at room temperature. The mixture was gradually warmed while stirring and reached 55° C. after 14 minutes, at which time the phosphorous acid went into solution. Heating was then continued until a temperature of 160° C. was reached after 64 minutes. The resulting product was cooled and found to have an index of refraction $n_{25}D=1.5558$. Twenty grams of this product were placed in a molecular still and distilled at a pressure of 8 microns of Hg and an oil bath temperature of 110–120° C. to give 19.5 g. of diphenyl phosphite which was a clear oil with an index of refraction, $n_{25}D=1.5562$. This product analyzed 13.0% P, Cl⁻ nil (theory 13.2% P, 0.0% Cl) and had a specific gravity of $$1.2197 \frac{25}{25}$$

Example 2

Di(para-cresyl) phosphite was prepared in a manner similar to Example 1, supra, by placing 5.5 grams of phosphorous acid and 47.2 grams of tri(para-cresyl) phosphite in the reaction flask. The phosphorous acid was again insoluble but began to go into solution after 13 minutes of heating when the temperature reached 60° C. Heating was continued to a temperature of 100° C. after 38 minutes. The product was cooled to give a clear oil, $n_{25}D=1.5469$. 10 grams of this product was distilled in a molecular still at 115–125° C. at 5 microns to yield 9.9 g. of di(para-cresyl) phosphite, $n_{25}D=1.5466$, which analyzed 11.7% P, Cl⁻ nil (theory 11.8% P, 0.0% Cl), and had a specific gravity of $$1.5669 \frac{25}{25}$$

Example 3

The process of Example 2, supra, was repeated using 70.4 g. of tri(meta-cresyl) phosphite and 8.2 g. of phosphorous acid. The acid went into solution at 65–68° C. and the charge was heated to 100° C. over a 40 minute period. It was held at 100° C. for 10 minutes and cooled. A quantitative yield of di(meta-cresyl) phosphite resulted, $n_{25}D=1.5475$. 10.0 grams were distilled in a molecular still at 90–100° C. oil bath temperature at 5 microns to yield 8.9 grams of di(meta-cresyl) phosphite, $n_{25}D=1.5468$.

Example 4

Di(ortho-cresyl) phosphite was prepared as in Example 3, supra, to give a product distilling at 100–110° C. oil bath temperature at 5 microns with an index of refraction, $n_{25}D=1.5495$.

Example 5

Di(parachlorophenyl) phosphite was prepared by reacting 66.5 grams of tri(parachlorophenyl) phosphite and 6.6 grams of phosphorous acid. The mixture was heated slowly and at 50–55° C. the phosphorous acid began to dissolve and was completely in solution at 77° C. The mixture was heated to 100° C. and held for ten minutes before cooling. A quantitative yield of 73.1 grams of product resulted, $n_{25}D=1.5706$. It solidified on standing and the solid had a melting point of 42–43° C. 10.0 grams of this material was distilled at 125–135° C. at 5 microns to give 8.5 grams of di(parachlorophenyl) phosphite, $n_{25}D=1.5708$, which solidified on standing.

Example 6

Di(paranitrophenyl) phosphite was prepared by reacting 10.0 grams of tri(paranitrophenyl) phosphite and 0.918 grams of phosphorous acid in 200 ml. of benzene. The two reactants were essentially insoluble in the benzene. The mixture was warmed to reflux temperature and heated for 2½ hours until the mixture cleared to form a clear amber solution in the benzene. The solution was refluxed for an additional hour and filtered to remove a small amount of tar. The benzene was then evaporated leaving 10.2 grams of gray solid residue with a melting point of 98–100° C.

Example 7

Di(tertiary butylphenyl) phosphite was prepared by placing 38.7 grams of super-cooled, liquid tri(tertiary butylphenyl) phosphite and 3.3 grams of phosphorous acid in a reaction flask. This mixture solidified when stirring but upon warming it became a liquid and was heated to 110° C. for 10 minutes. It was cooled to yield 42.0 grams of product, $n_{25}D=1.5284$, which solidified on standing. 10.0 grams were distilled in the molecular still at a bath temperature of 160–170° C. at 3–5 microns.

7.2 grams of di(tertiary butylphenyl) phosphite resulted, $n_{25}D=1.5280$. It slowly solidified.

The temperatures at which these reactions take place is not critical. It should be high enough that the reactants form a solution and low enough that there is no decomposition of the reactants and/or products. Generally, the range of temperatures between 40° C. and 200° C. is satisfactory. As indicated in the examples, solution of the reactants is generally effected in the 50° to 70° C. range with the reaction being completed at 100° C.–160° C.

The time of reaction is not critical and will of course vary with the temperature; at the temperatures indicated, the reaction is usually complete in approximately one to four hours. Since no by-products are formed and no purification is usually necessary, it does not damage the resulting diaryl phosphite if it is held at reaction temperature after the reaction is complete.

The triaryl phosphite and phosphorous acid reactants are easily procured or manufactured from commercially available materials by methods well known in the art. Triaryl phosphite reactants may be prepared by reacting three moles of phenol or a substituted phenol with one mole of phosphorus trichloride. Phosphorous acid may similarly be prepared by reacting three moles of water with one mole of phosphorus trichloride.

The phosphite products encompassed by my invention may be used as flameproofing agents for chlorinated wax or naphthalene as disclosed in U.S. Patent 2,480,790 and as anti-clouding agents as disclosed in U.S. Patent 2,564,646. In addition, these products have numerous uses as chemical intermediates.

The terms "diphenyl" and "triphenyl," as set forth in the claims, are intended to include nuclear substituted phenyl substituents such as cresyl, para-chlorophenyl, para-nitrophenyl, tertiary-butylphenyl, and the like.

The foregoing detailed description has been given for clearness of understanding only, and no unnecessary limitations should be understood therefrom, as modifications will be obvious to those skilled in the art.

What is claimed is:

1. A method for producing diphenyl phosphites which comprises reacting triphenyl phosphite and phosphorous acid below decomposition temperatures.

2. A method for producing diphenyl phosphites which comprises reacting substantially stoichiometric quantities of triphenyl phosphite and phosphorous acid below decomposition temperatures.

3. The method as set forth in claim 2 wherein the phenyl radical is unsubstituted phenyl.

4. The method as set forth in claim 2 wherein the phenyl radical is cresyl.

5. The method as set forth in claim 2 wherein the phenyl radical is para-chlorophenyl.

6. The method as set forth in claim 2 wherein the phenyl radical is para-nitrophenyl.

7. The method as set forth in claim 2 wherein the phenyl radical is tetriary-butylphenyl.

8. A method for producing diphenyl phosphites which comprises reacting substantially stoichiometric quantities of triphenyl phosphite and phosphorous acid at a reaction temperature which is high enough to form a solution of the reactants and low enough to avoid decomposition for a perid of time sufficient to complete the reaction.

References Cited in the file of this patent

UNITED STATES PATENTS

| | | |
|---|---|---|
| 2,480,790 | Truhlar et al. | Aug. 30, 1949 |
| 2,564,646 | Leistner et al. | Aug. 14, 1951 |
| 2,708,204 | Bell et al. | May 10, 1955 |
| 2,834,797 | Chadwick | May 13, 1958 |

OTHER REFERENCES

Wagner and Zook, "Synthetic Organic Chemistry," John Wiley & Sons, N.Y. (1953), p. 488.